UNITED STATES PATENT OFFICE.

WILLIAM B. MEIXELL, OF SAYRE, PENNSYLVANIA, ASSIGNOR OF ONE-THIRD TO JAMES B. STALNAKER AND ONE-THIRD TO THOMAS WHEELER JENKINS, BOTH OF WILLIAMSPORT, PENNSYLVANIA.

PROCESS FOR REMOVING INK OR COLORING-MATTER FROM PAPER.

989,023. Specification of Letters Patent. Patented Apr. 11, 1911.

No Drawing. Application filed August 10, 1910. Serial No. 576,491.

*To all whom it may concern:*

Be it known that I, WILLIAM B. MEIXELL, a citizen of the United States, and a resident of Sayre, in the county of Bradford and State of Pennsylvania, have made certain new and useful Improvements in Processes for Removing Ink or Coloring-Matter from Paper, of which the following is a specification.

My invention relates to an improved process for removing ink, coloring matter or pigments from paper, and it consists in the steps hereinafter enumerated.

The main object of my invention is to provide an exceedingly simple process for taking out the ink from printed papers, such as old newspapers, book paper, etc., without harming the fiber, so that the latter can be repulped and made again into white paper.

A further object of my invention is to provide a process for removing ink or coloring matter, which is not only simple, but is very cheap, the ingredients used in the process being obtainable everywhere and costing comparatively little.

Other objects and advantages will appear in the following specification and the novel steps of the process will be particularly pointed out in the appended claims.

A difficulty which has been heretofore encountered by those who have endeavored to rid printed paper from the ink or coloring matter thereon has been that the many stages through which the paper must pass in the renovating process, together with the cost of the chemicals which are necessary, has made these processes so expensive that some of them have been abandoned on account of the cost. Furthermore, in many of these processes, the fiber of the paper itself is injured so that when the paper is repulped, it is not fit for the manufacture of paper as good as the original. Again, it has been found that it is an exceedingly difficult matter to treat paper which has been printed upon, so as to restore it to its pristine whiteness.

My improved process obviates all these disadvantages and produces a pulp which is approximately, if not quite, as white as the original, and which retains all of its adhesive qualities, so that a paper prepared from it is as strong and durable as that prepared with freshly made pulp.

In carrying out my process, I take the paper with the printed or coloring matter thereon, and, preferably, treat it in a rotary steam "cooker" so as to soften up the ink. The paper is then put in the beaters and is beaten up into pulp with either hot or cold water. When the paper has been finely divided, I pass into the beater a mixture of water and common whiting, i. e., levigated or unlevigated chalk. If the former is used the action is quicker, although the ground chalk may be used for the same purpose. The precise action of the whiting on the ink or coloring matter is not known. It is presumed that there is both a chemical and a mechanical action. As soon as the mixture of the whiting, water and paper pulp has been thoroughly beaten in the beaters, the pulp is passed on then to other beaters where it is thoroughly washed. The washing tends to drain out the ink, coloring matter and the whiting; and each subsequent washing leaves the pulp whiter than before, until finally the pulp is restored to its original whiteness. It can now be passed on to the paper machines and the paper prepared from it will be, as stated before, in all respects, equal to that prepared from freshly made pulp.

While I have spoken primarily of printed paper, it will be understood that this process is equally applicable to various kinds of paper, such as wall paper, coated and sized paper, book paper, as well as newspaper papers. The value of the process lies largely in its simplicity and cheapness.

I am aware that various earths have been used as fillers for paper. My process involves nothing of the kind. The earth does not necessarily enter into the final product, although it would not injure the paper if it did, but it is preferably washed from the pulp prior to its manufacture into paper and in being so washed carries with it the ink or other coloring matter. I, therefore, do not claim the process of manufacturing paper by the use of chalk as a filler.

What I claim is:

1. The herein described process of extracting ink or other coloring matter from paper which consists in first beating up the paper into a pulp, then treating it with a mixture of earthy matter and water, and finally washing the pulp.

2. The herein described process of extracting ink or other coloring matter from paper which consists in beating up the paper into pulp with water, adding a mixture of water and whiting, beating up said paper with said mixture, and finally washing the pulp.

3. The herein described process of extracting ink or other coloring matter from paper which consists in beating up the paper into a pulp with water, adding a mixture of water and whiting, beating up the mixture of pulp, water and whiting, and finally washing the paper by beating up the pulp with an excess of fresh water and draining off the whiting and coloring matter.

WILLIAM B. MEIXELL.

Witnesses:
L. A. STANLEY,
SOLON C. KEMON.